United States Patent
Lemaitre (10) Patent No.: US 10,167,034 B2
(45) Date of Patent: Jan. 1, 2019

(54) VEHICLE WITH A SLOPING STEERING COLUMN

(71) Applicant: DECATHLON, Villeneuve d'Ascq (FR)

(72) Inventor: Benoit Lemaitre, Flines-lez-Raches (FR)

(73) Assignee: DECATHLON, Villeneuve d'Ascq (FR)

( * ) Notice: Subject to any disclaimer, the term of this patent is extended or adjusted under 35 U.S.C. 154(b) by 0 days.

(21) Appl. No.: 15/512,930

(22) PCT Filed: Sep. 17, 2015

(86) PCT No.: PCT/FR2015/052493
§ 371 (c)(1),
(2) Date: Mar. 21, 2017

(87) PCT Pub. No.: WO2016/046475
PCT Pub. Date: Mar. 31, 2016

(65) Prior Publication Data
US 2017/0297645 A1     Oct. 19, 2017

(30) Foreign Application Priority Data
Sep. 23, 2014 (FR) ..................... 14 58938

(51) Int. Cl.
*B62K 5/08*     (2006.01)
*B62K 3/00*     (2006.01)
(Continued)

(52) U.S. Cl.
CPC ............... *B62K 5/08* (2013.01); *B62K 3/002* (2013.01); *B62K 5/05* (2013.01); *B62K 21/00* (2013.01); *B62K 21/18* (2013.01); *F16D 3/38* (2013.01)

(58) Field of Classification Search
CPC ...... A63C 17/011; A63C 17/017; B62K 3/002
See application file for complete search history.

(56) References Cited

U.S. PATENT DOCUMENTS

| | | | |
|---|---|---|---|
| 1,227,888 A * | 5/1917 | Converse | B62K 3/002 280/87.041 |
| 1,416,864 A | 5/1922 | Parkes | |

(Continued)

FOREIGN PATENT DOCUMENTS

| CN | 101229835 A | 7/2008 |
|---|---|---|
| CN | 201405978 Y | 2/2010 |

*Primary Examiner* — Erez Gurari
(74) *Attorney, Agent, or Firm* — MH2 Technology Law Group, LLP (57) ABSTRACT

The invention relates to a vehicle (10), e.g. of the scooter type, comprising:
  a deck (12);
  tail gear (30) having single contact means (32);
  a steering assembly (16) comprising at least a steering column (18) having a first axis (X1), the first axis and the plane of the support forming a first angle (a1);
  nose gear (22);
  the nose gear being mounted to pivot relative to the deck about a second axis (X2);
  the steering column being arranged in such a manner that pivoting the steering column about the first axis causes the nose gear to pivot about the second axis; and
  the first and second axes sloping relative to each other, thereby defining a second angle (a2).
The invention is characterized by the fact that the first angle (a1) is not variable while the vehicle is in use.

11 Claims, 5 Drawing Sheets

(51) Int. Cl.
*B62K 5/05* (2013.01)
*B62K 21/00* (2006.01)
*B62K 21/18* (2006.01)
*F16D 3/38* (2006.01)

(56) References Cited

U.S. PATENT DOCUMENTS

| | | | |
|---|---|---|---|
| 6,511,083 B1 | 1/2003 | Tai-Yuan | |
| 8,696,000 B1 * | 4/2014 | Chen | B62K 3/002 |
| | | | 280/11.28 |
| 2010/0013183 A1 | 1/2010 | He | |

* cited by examiner

VEHICLE WITH A SLOPING STEERING COLUMN

BACKGROUND OF THE DISCLOSURE

The present disclosure relates to a vehicle, e.g. of the scooter type. A particular application for the disclosure lies in open-air leisure activity or for medium or long distance travel, in particular in an urban environment.

Numerous examples of vehicles are known, such as skateboards or scooters, that are suitable for these various applications.

In order to make them easier to use, in particular for users whose sense of balance may be poorly developed, such as children, there exist scooters that comprise: a deck having a support plane for supporting a user; a steering assembly having a steering column with a first axis; and nose gear having two wheels. In such scooters, the steering column is mounted to pivot relative to the deck about a first axis, with the first axis and the support plane forming a first angle. The nose gear is mounted to pivot relative to the deck about a second axis. The steering column is arranged in such a manner that pivoting the steering column about the first axis causes the nose gear to pivot about the second axis.

Usually, the first and second axes coincide and are substantially perpendicular to the support plane of the deck, which makes the scooter difficult to use, is not very intuitive, and is relatively unstable.

The user is then positioned close to the steering column, generally close to the front end of the deck, and runs the risk of falling off the deck when the path followed by the scooter is changed suddenly, e.g. if one of the wheels comes into contact with a stone or the curb of a sidewalk.

U.S. Pat. No. 6,511,083 describes a skateboard in which the first axis and the second axis slope relative to each other so as to define a second angle.

Nevertheless, in the skateboard described by that document, the steering assembly is configured in such a manner that the first angle can be changed by the user while using the skateboard for the purpose of changing the position of the steering assembly so as to enable the user to vary the position of the center of gravity, e.g. in order to perform acrobatic stunts.

That ability to modify the first angle makes the vehicle particularly unstable in use, and thus unsuitable for users whose sense of balance is poorly developed.

SUMMARY OF THE DISCLOSURE

An object of the present disclosure, among others, is to resolve the above-described shortcomings of existing vehicles, by proposing a vehicle that is stable and that can be steered in easy and intuitive manner, even by users having little sense of balance.

This object is achieved by the fact that the disclosure provides a vehicle, e.g. of the scooter type, comprising a deck suitable for supporting a user directly or indirectly and having a support plane, tail gear having single contact means, and a steering assembly comprising at least one steering column having a first axis, the steering column being mounted to pivot relative to the deck about a first axis, and the first axis and the support plane forming a first angle. In addition, the vehicle of the present disclosure comprises nose gear having at least first and second ground contact means, the nose gear being pivotally mounted relative to the deck about a second axis, and the steering column being arranged so that pivoting the steering column about the first axis causes the nose gear to pivot about the second axis. In the vehicle of the present disclosure, the first and second axes slope relative to each other and define a second angle, the first angle not being variable while the vehicle is in use.

The second angle may also not be variable while the vehicle is in use.

The vehicle of the present disclosure thus benefits from the advantage that the first and second axes slope relative to each other, without compromising the ability of the user to remain on the deck and making the steering assembly easier to actuate.

If the first and second axes were to coincide, both being inclined relative to a direction substantially perpendicular to the support plane, e.g. so as to move the center of gravity of the vehicle away from the front end of the deck, one of the contact means would tend to lift off the ground whenever the user pivots the steering column; this lifting would cause the deck to tilt in the direction opposite to the direction being followed by the vehicle, thereby unstabilizing the user and running the risk of leading to a fall.

In addition, the setting of the first angle, which is selected in the present disclosure in such a manner as to match the user of the vehicle does not run any risk of being modified accidentally while the vehicle is in use, where such a change could disturb the user, and possibly lead to a fall.

Finally, the presence firstly of the first and second contact means making up the nose gear, and secondly of single contact means making up the tail gear improves the stability of the vehicle. In particular, since the tail gear has single contact means, it can be understood that the vehicle remains in contact with the ground regardless of the change of direction inherent to pivoting the steering column.

The disclosure is set out below in a series of embodiment variants that may be considered singly or in combination with one or more of the preceding variants.

The vehicle may further include an angle joint device configured to connect together the steering assembly and the nose gear.

The angle joint device may comprise:
a first element mounted on the steering column;
a second element mounted on the nose gear; and
a third element mounted on the first element and on the second element.

The third element may be arranged between the first element and the second element.

The first axis and the second axis may intersect in the angle joint device.

By this provision, and because of the structure of the angle joint device, the operation of the vehicle is further simplified, and the turning of the nose gear about the second axis by turning the steering column about the first axis is improved. In addition, the operating reliability of the vehicle, and more particularly the steering of the vehicle, is also improved.

The angle joint device may comprise a cardan joint.

Thus, the complexity and the manufacturing cost of the vehicle of the present disclosure are reduced, and its operating reliability is improved.

The first angle may be an acute angle.

The first angle may be greater than 45°, or even greater than 60°.

The first angle is more particularly defined between the portion of the deck configured to support a user, and the first axis extending from the nose gear towards the control means of the steering column.

By this provision, when the steering column is mounted close to the front end of the deck, the slope of the steering column relative to a direction substantially perpendicular to the support plane enables the user to be further away from the front end of the deck. Consequently, the center of gravity is also moved away from the front end of the deck, thereby further improving the stability of the unit constituted by the vehicle and its user, while the vehicle is in use.

The second axis may slope relative to the support plane of the deck.

The second axis and the support plane may form a third angle, the third angle being a right angle.

In other words, the second axis extends along a direction that is substantially perpendicular to the support plane.

By this provision, the first and second contact means remain in contact with the ground when the nose gear pivots about the second axis. The stability of the vehicle is thus the same as for prior art scooters.

Alternatively, the second axis and the support plane form a third angle, the third angle being an obtuse angle.

The third angle may be greater than 95°, and even greater than 100°.

The third angle is more particularly defined between the portion of the deck that is configured to support a user and the second axis that extends from the nose gear substantially towards the control means of the steering column.

By this provision, the contact means further from the center of rotation of the vehicle tends to press down against the ground when the steering column is pivoted about the second axis, whereas the contact means closer to the center of rotation of the vehicle tend to lift off the ground. In reaction to the behavior of the nose gear, the deck on which the nose gear is mounted slopes about the longitudinal axis of the vehicle in the same direction as the direction taken by the vehicle. Thus, the deck of the vehicle of the present disclosure slopes in the same direction as the direction taken by the vehicle; the stability of the user on the deck of the vehicle is thus improved.

The "center of rotation" of the vehicle means the center of the circle having an arc that is drawn by the path followed by the vehicle when the user pivots the steering column about the first axis.

The term "longitudinal" axis of the vehicle is used to mean the longitudinal axis of its deck.

The third angle may also not be variable while the vehicle is in use.

By this provision, the behavior of the nose gear, and consequently the behavior of the deck, runs no risk of being changed accidentally while the vehicle is in use.

The first ground contact means may include a first wheel mounted to rotate about an associated axis of rotation.

The second ground contact means may comprise a second wheel mounted to rotate about an associated axis of rotation.

Thus, the vehicle is made easier to move and its manufacture and maintenance are simplified.

The axes of rotation of the first and second wheels may coincide.

Alternatively, the first wheel forms a non-zero first camber.

The first camber may be negative.

The term "camber" is used herein to designate the angle formed by the plane of rotation of the first wheel relative to a direction substantially perpendicular to the support plane of the deck, when looked at from the front of the vehicle. Thus, when the first camber is negative, the top of the first wheel slopes towards the vehicle.

By means of this provision, the retention of the first wheel on the ground during travel of the vehicle is improved, amongst other things.

The second wheel may form a second non-zero camber. The second camber may be identical to the first camber.

By this provision, the behavior of the vehicle remains identical regardless of the direction in which the steering column is pivoted about the first axis.

The nose gear may have a longitudinal axis, the vehicle also having return means configured to place the longitudinal axis of the nose gear so as to be substantially parallel to the support plane of the deck when the steering column is pivoted about the first axis.

By having return means present, when the nose gear is pivoted about the second axis, the slope of the longitudinal axis of the nose gear relative to the support plane of the deck remains limited, thereby reducing any risk of destabilizing the user.

In other words, the presence of the return means serves to make steering of the vehicle stiffer, e.g. for the purpose of limiting the effects that might arise as a result of the user pivoting the steering column suddenly.

BRIEF DESCRIPTION OF THE DRAWINGS

Other characteristics and advantages of the disclosure appear more clearly and more completely on reading the following description of an embodiment, given by way of non-limiting example and with reference to the accompanying drawings, in which.

DETAILED DESCRIPTION OF THE DISCLOSURE

Figure 1:
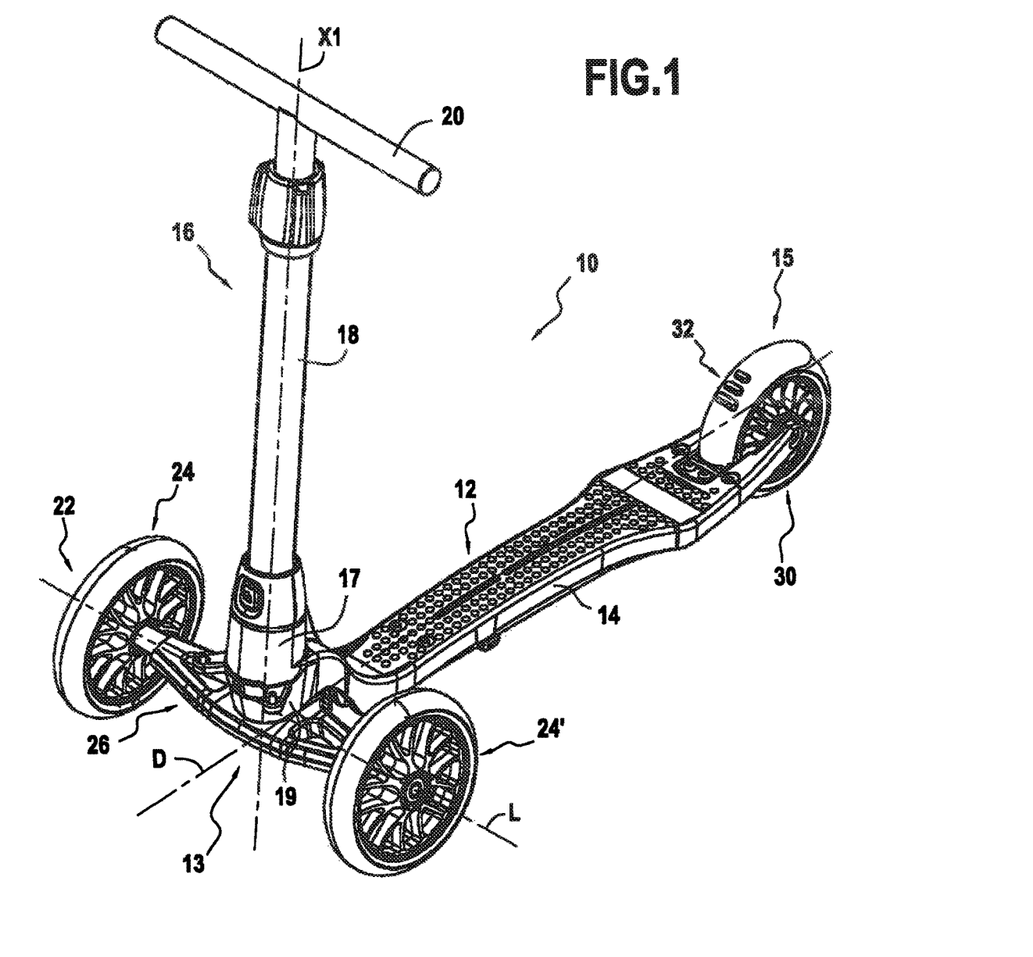
FIG. 1 is a diagram of an example vehicle of the present disclosure.

In the example shown in FIG. 1, the vehicle 10, specifically a scooter, comprises firstly a deck 12 having a support plane 14, the deck 12 being configured to support a user directly or indirectly; the support plane 14 has a longitudinal direction D that defines a front end 13 and a rear end 15.

By extension, in the description below, the front and rear ends 13 and 14 of the support plane 14 are considered as being the front and rear ends of the vehicle 10 of the present disclosure.

The vehicle 10 also has a steering assembly 16 comprising a steering column 18 having a first axis X1; the steering assembly 16 also has control means 20, specifically a handlebar mounted at the top end of the steering column 18.

The "top" end of the steering column 18 should be understood as being its end opposite from the end via which the steering column 18 is secured to the deck 12.

The vehicle 10 also has a front nose gear 22 mounted at the front end 13 of the vehicle 10. By way of example and in non-limiting manner, the front nose gear comprises first and second contact means 24 and 24' configured to provide contact between the vehicle 10 and the ground. By way of example and in non-limiting manner, the first and second contact means 24 and 24' comprise respectively first and second wheels 25 and 25'.

The front near gear 22 also has a longitudinal axis L and a front axle 26 with the first and second wheels 25 and 25' mounted at its longitudinal ends.

The vehicle 10 of the present disclosure also includes tail gear 30 mounted at the rear end 15 of the vehicle 10. By way of example and in non-limiting manner, the tail gear 30 comprises single contact means 32, e.g. a wheel.

Figure 2:
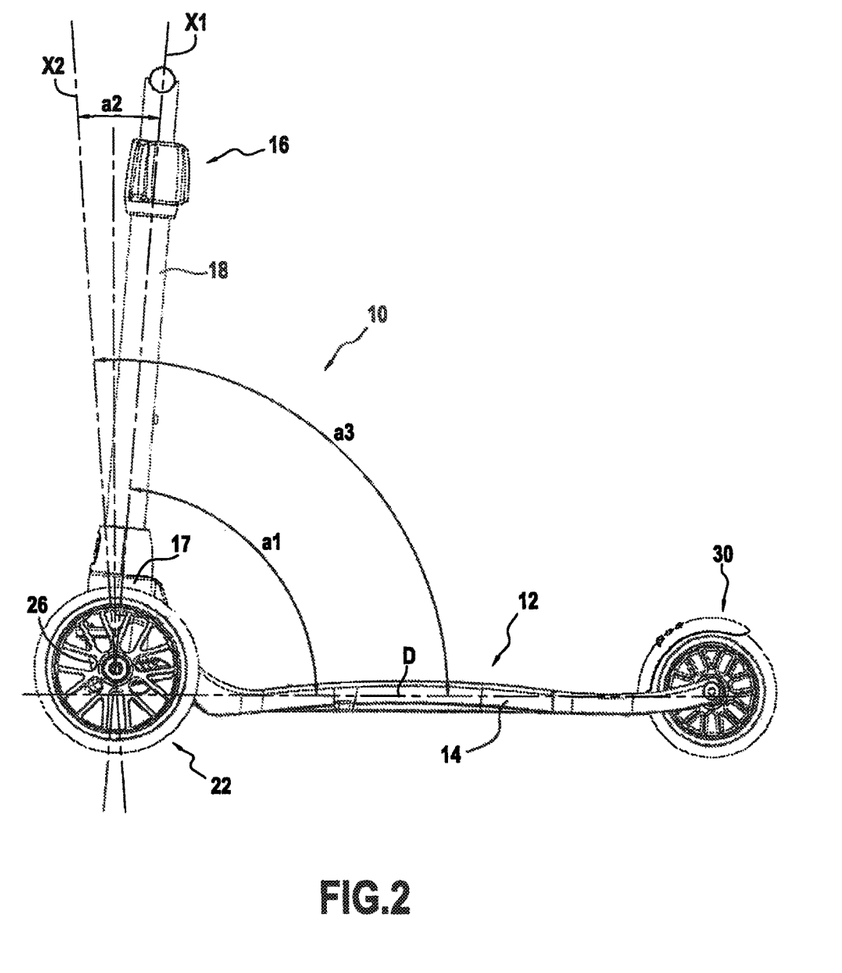
FIG. 2 is a diagrammatic side view of the FIG. 1 vehicle.

As can be seen in particular in FIGS. 1 and 2, the steering column 18 is pivotally mounted relative to the deck 12 about a first axis X1.

By way of example and in non-limiting manner, the deck 12 has a top sleeve 17 configured to guide the steering column 18 pivotally about the axis X1.

As shown in FIG. 2, the first axis X1 and the support plane 14 form a first angle a1; the "first angle" a1 is the angle formed between the first axis X1 and the longitudinal axis D of the support plane 14, and more particularly the angle formed between the portion of the deck 12 that is configured to support a user and the first axis X1 extending from the nose gear 22 towards the control means 20 of the steering column 18.

In particular by the presence of the top sleeve 17, the vehicle 10 is configured so that the first angle a1 is not variable; without going beyond the ambit of the present disclosure, it would also be possible to provide the vehicle 10 with adjustment means that are configured to enable the value of the first angle a1 to be modified, e.g. as a function of the user of the vehicle 10, prior to the vehicle 10 being used.

The nose gear 22 is mounted to pivot relative to the deck 12 about a second axis X2; by way of example and in non-limiting manner, the deck 12 includes a bottom sleeve 19 configured to guide the front axle 26 of the nose gear 22 in pivoting about the second axis X2.

Consequently, it can be understood that the deck 12, the steering assembly 16, and the nose gear 22 of the vehicle 10 of the present disclosure are secured to each other in such a manner as to be capable of being pivoted together about the longitudinal direction D of the support plane 14.

As shown in FIG. 2, the first axis X1 and the second axis X2 slope relative to each other, defining a second angle a2.

Furthermore, the second axis X2 and the support plane 14 form a third angle a3; the "third angle" a3 is used, in manner similar to the first angle a1, to designate the angle formed between the second axis X2 and the longitudinal direction D of the support plane 14, and more particularly the angle formed between the portion of the deck 12 that is configured to support a user and the second axis X2 extending from the nose gear 22 substantially towards the control means 20 of the steering column 18.

By way of example and in non-limiting manner, the vehicle 10 is configured so that the third angle a3 is not variable; without going beyond the ambit of the present disclosure, it would also be possible to provide for adjustment means that are configured to modify the value of the third angle a3, prior to using the vehicle 10.

Assuming that the first and third angles a1 and a3 are not variable, it can be understood that the second angle a2 formed between the first and second axes X1 and X2 is likewise not variable.

Figure 3:
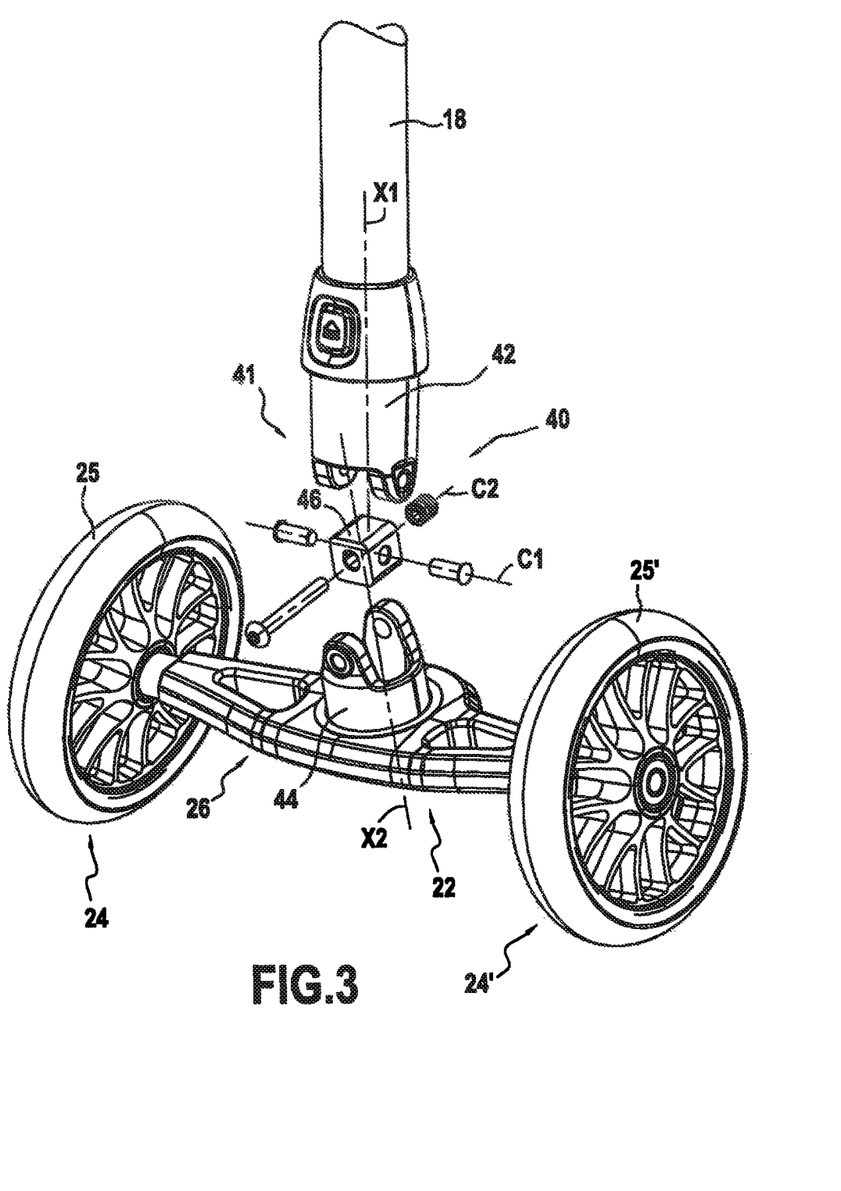
FIG. 3 is a diagrammatic exploded view of the angle joint device of the vehicle of the present disclosure.

As can be seen in greater detail in FIG. 3, the vehicle 10 of the present disclosure includes an angle joint device 40 configured to connect the steering assembly 16 to the nose gear 22; by way of example and in non-limiting manner, the angle joint device 40 of the vehicle 10 of the present disclosure comprises a cardan joint 41.

As can be seen in the various figures, and in particular in FIG. 2, the first axis X1 and the second axis X2 intersect in the angle joint device 40.

By way of example and in non-limiting manner, the angle joint device 40 has a first element 42 mounted on the steering column 18, a second element 44 mounted on the nose gear 22, and a third element 46 mounted on the first element 42 and on the second element 44, and more particularly between the first and second elements 42 and 44.

In particular, the angle joint device 40 has a first axis C1 that, by way of example and in non-limiting manner, has two pins extending therealong, the third element 46 being mounted to the first element 42 about the first axis C1.

In addition, as shown in FIG. 3, the angle joint device 40 also includes a second axis C2 that, by way of example and in non-limiting manner, has a nut and a bolt extending therealong, the third element 46 being fastened to the second element 42 about the second axis C2.

By way of example and in non-limiting manner, the first element 42 has removable fastener means configured to enable the steering column 18 to be separated from the first element 42, e.g. in order to make the vehicle 10 of the present disclosure easier to store when it is not in use.

It can thus be understood that when the steering column 18 pivots about the first axis X1, it also causes the first element 42 of the angle joint device 40 to pivot about the first axis X1; consequently, because the first and third elements 42 and 46 are secured to each other, the third element 46 is turned.

The third element 46 then in turn causes the second element 44 to turn about the second axis X2.

The nose gear 22 on which the second element 44 is mounted is thus in turn caused to turn about the second axis X2.

In other words, it can be understood that the angle joint device 40 is configured in such a manner that pivoting the steering column 18 about the first axis X1 causes the nose gear 22 to pivot about the second axis X2.

In other words, the angle joint device 40 is configured to transmit pivoting from the steering column 18 to the nose gear 22.

As shown in particular in FIG. 2, the first axis X1 slopes relative to the support plane 14 of the deck 12.

More particularly, the first axis X1 slopes relative to a direction that is substantially perpendicular relative to the support plane 14.

Thus, by way of example and in non-limiting manner, the first angle a1 formed between the first axis X1 and the plane of the support 14 is an acute angle.

The slope of the first axis X1 relative to a direction substantially perpendicular to the support plane 14 thus enables the control means 20 to be moved away from the front end 13 of the vehicle 10; consequently, the center of gravity of the vehicle 10 is also moved away from the front end 13, thereby improving the stability of the unit constituted by the vehicle 10 and its user.

Furthermore, and as can be seen clearly in FIG. 2, by way of example and in non-limiting manner, the vehicle 10 is configured in such a manner that the third angle a3 is an obtuse angle; in other words, the second angle X2 slopes relative to a direction that is substantially perpendicular to the support plane 14 of the deck 12.

By way of example and in non-limiting manner, the second axis X2 slopes away from the deck 12 of the vehicle 10.

By this configuration, pivoting the nose gear 22 about the second axis X2 tends to cause the longitudinal axis L of the nose gear 22 to slope relative to the support plane 14 of the deck 12.

Figure 4:
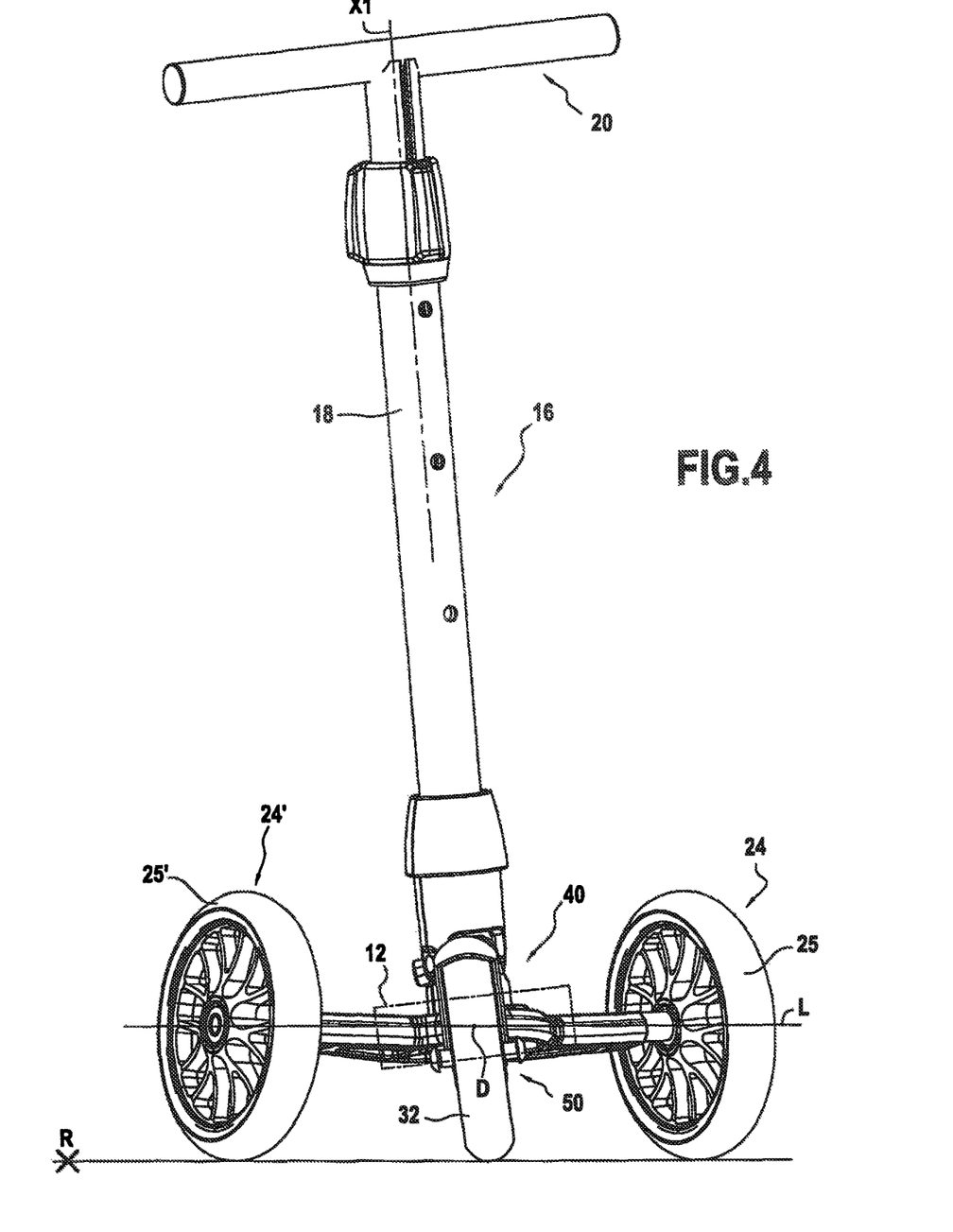
FIG. 4 is a rear view of the FIG. 1 vehicle showing the steering column pivoted about the first axis.

FIG. 4 is a rear view of the vehicle 10 when the steering column 18 is pivoted about the first axis X1 as a result of the control means 20 being actuated.

In the example shown in this figure, the pivoting of the steering column 18 about the first axis X1 serves to cause the vehicle 10 to turn to the left, so as to describe a path in the form of a circular arc, with the center of rotation R of the vehicle 10, defined as being the center of the circle defined by the arc drawn by the path of the vehicle 10, then being arranged on the left of the vehicle 10.

In this embodiment, in which the third angle a3 is an obtuse angle, pivoting the steering column 18 about the first axis X1 causes the longitudinal axis L of the nose gear 22 to slope; the contact means 24' closer to the center of rotation R of the vehicle 10 then tend to lift off the ground, whereas the contact means 24 further from the center of rotation R, on the contrary, tend to press harder against the ground.

In reaction, and because the deck 12 is secured to the nose gear 22, the deck 12, which for reasons of clarity is drawn in chain-dotted lines in FIG. 4, then tends to slope about its longitudinal axis D towards the center of rotation R.

It can thus be understood that as a result of the second axis X2 sloping, pivoting the steering column 18 about the first axis X1 causes the deck 12 to tilt towards the center of rotation R; the user standing on the support plane 14 of the deck 12 is then not destabilized by such sloping of the deck 12.

By way of example and in non-limiting manner, the vehicle 10 may include return means 50 configured to place the longitudinal axis L of the nose gear 22 so as to be substantially parallel to the support plane 14 of the deck 12 when the steering column 18 is pivoted about the first axis X1 in either of the possible directions.

Such return means 50 thus make it possible, amongst other things, to make steering the vehicle 10 stiffer, so as to limit the effects that suddenly pivoting the steering column 18 could have on the path followed by the vehicle 10.

As shown in the various figures, the first and second wheels 25 and 25' of the first and second contact means 24 and 24' of the vehicle 10 are mounted to rotate about their associated axes of rotation Y and Y'.

Figure 5:
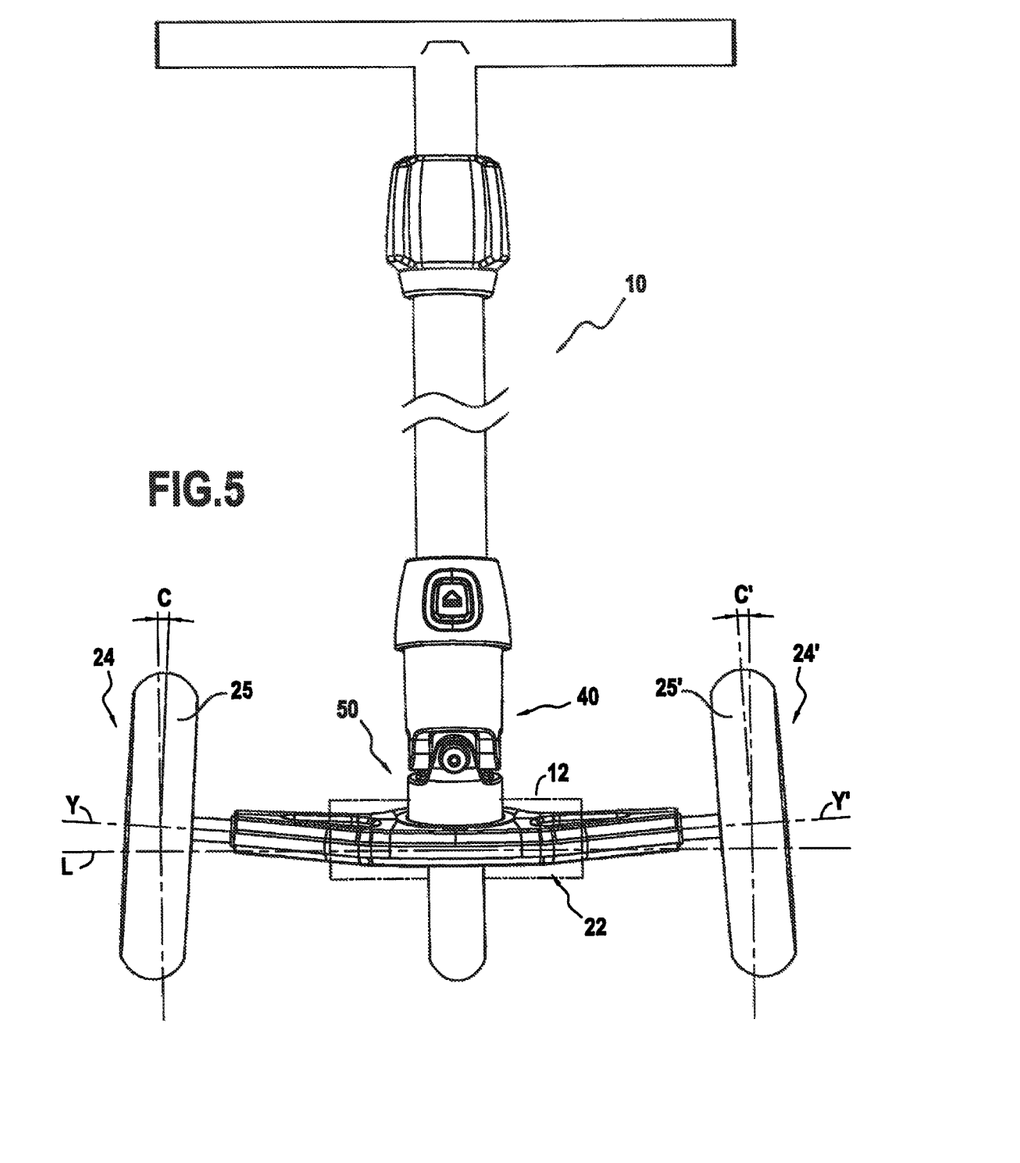
FIG. 5 is a front view of the FIG. 1 vehicle.

By way of example and in non-limiting manner, as shown in FIG. 5, where for reasons of clarity the deck 12 is likewise drawn in chain-dotted lines, the axes of rotation Y and Y' slope relative to the longitudinal axis L of the nose gear 22.

Thus, the first and second wheels 25 and 25' present respective non-zero first and second cambers C and C'.

The first and second cambers C and C' designate the angles formed by the respective planes in which the first and second wheels 25 and 25' rotate relative to a direction substantially perpendicular to the support plane 14 of the deck 12.

These slopes of the first and second wheels 25 and 25' make it possible, amongst other things, to improve the grip of the vehicle 10 of the present disclosure.

In addition, the fact that the tail gear 30 has only single contact means 32 also contributes to the grip of the vehicle 10 of the present disclosure, and also to its stability, in particular when the steering column 18 is actuated to change the travel direction of the vehicle 10.

The above description is given by way of example and therefore does not limit the disclosure; in particular, although the disclosure is particularly adapted to the field of scooters, it may also be applied to any travel means, such as a roller board or a skateboard, so as to make the vehicle easier to control, without compromising stability.

The invention claimed is:

1. A scooter type vehicle comprising:
a deck suitable for supporting a user directly or indirectly and having a support plane and a longitudinal axis;
tail gear having a single contact device;
a steering assembly comprising at least one steering column having a first axis, the steering column being mounted to pivot relative to the deck about the first axis, the first axis and the support plane forming a first angle;
nose gear having at least first and second ground contact device;
the nose gear being pivotally mounted relative to the deck about a second axis;
the steering column being arranged so that pivoting the steering column about the first axis causes the nose gear to pivot about the second axis;
the first axis and the second axis sloping relative to each other and defining a second angle; and
the second axis sloping relative to the support plane of the deck, the second axis and the support plane forming a third angle, the third angle being an obtuse angle;
wherein the first angle is not variable while the vehicle is in use, and wherein the deck tilts about the longitudinal axis towards a center of rotation of the vehicle when the steering column is pivoted about the first axis.

2. The vehicle according to claim 1, wherein the vehicle further comprises an angle joint device configured to connect together the steering assembly and the nose gear.

3. The vehicle according to claim 2, wherein the angle joint device comprises:
a first element mounted on the steering column;
a second element mounted on the nose gear; and
a third element mounted on the first element and on the second element.

4. The vehicle according to claim 3, wherein the third element is arranged between the first element and the second element.

5. The vehicle according to claim 2, wherein the first axis and the second axis intersect in the angle joint device.

6. The vehicle according to claim 2, wherein the angle joint device comprises a cardan joint.

7. The vehicle according to claim 1, wherein the first angle is an acute angle.

8. The vehicle according to claim 1, wherein the third angle is not variable while the vehicle is in use.

9. The vehicle according to claim 1, wherein at least one of the first and second ground contact device of the nose gear comprise a wheel mounted to rotate about an associated axis of rotation.

10. The vehicle according to claim 9, wherein the wheel forms a non-zero camber.

11. A scooter type vehicle comprising:
a deck suitable for supporting a user directly or indirectly and having a support plane and a longitudinal axis;
tail gear having a single contact device;
a steering assembly comprising at least one steering column having a first axis, the steering column being mounted to pivot relative to the deck about the first axis, the first axis and the support plane forming a first angle;
nose gear having at least first and second ground contact device;
the nose gear being pivotally mounted relative to the deck about a second axis;

the steering column being arranged so that pivoting the steering column about the first axis causes the nose gear to pivot about the second axis;
the first axis and the second axis sloping relative to each other and defining a second angle; and
an angle joint device configured to connect together the steering assembly and the nose gear, the angle joint device comprising a cardan joint;
wherein the first angle is not variable while the vehicle is in use, and wherein the deck tilts about the longitudinal axis towards a center of rotation of the vehicle when the steering column is pivoted about the first axis.

* * * * *